United States Patent
Spears et al.

(10) Patent No.: US 10,735,711 B2
(45) Date of Patent: Aug. 4, 2020

(54) CREATING A THREE-DIMENSIONAL IMAGE VIA A WIDE-ANGLE CAMERA SENSOR

(71) Applicant: MOTOROLA MOBILITY LLC, Chicago, IL (US)

(72) Inventors: Kurt E. Spears, Fort Collins, CO (US); Sean C. Kelly, Barrington, IL (US); Yuxin Wang, Palatine, IL (US)

(73) Assignee: Motorola Mobility LLC, Chicago, IL (US)

( * ) Notice: Subject to any disclaimer, the term of this patent is extended or adjusted under 35 U.S.C. 154(b) by 461 days.

(21) Appl. No.: 15/588,537

(22) Filed: May 5, 2017

(65) Prior Publication Data

US 2018/0324399 A1 Nov. 8, 2018

(51) Int. Cl.
| | |
|---|---|
| *H04N 5/232* | (2006.01) |
| *H04N 13/156* | (2018.01) |
| *G06T 7/557* | (2017.01) |
| *H04N 13/178* | (2018.01) |
| *H04N 13/204* | (2018.01) |
| *H04N 13/254* | (2018.01) |

(Continued)

(52) U.S. Cl.
CPC ........... *H04N 13/156* (2018.05); *G06T 7/557* (2017.01); *H04N 5/23238* (2013.01); *H04N 5/23241* (2013.01); *H04N 5/232122* (2018.08); *H04N 13/128* (2018.05); *H04N 13/178* (2018.05); *H04N 13/204* (2018.05); *H04N 13/232* (2018.05); *H04N 13/254* (2018.05); *H04N 13/271* (2018.05); *H04N 13/296* (2018.05); *G06T 2207/10024* (2013.01); *G06T 2207/10052* (2013.01); *G06T 2207/20221* (2013.01)

(58) Field of Classification Search
CPC ......... H04N 2213/003; H04N 5/23238; H04N 13/271; G06T 7/50; G06T 7/521; G06T 7/557

See application file for complete search history.

(56) References Cited

U.S. PATENT DOCUMENTS

| | | | |
|---|---|---|---|
| 10,209,202 B1 * | 2/2019 | Sullivan | G01N 21/8806 |
| 2012/0033043 A1 * | 2/2012 | Han | H04N 13/239 |
| | | | 348/46 |

(Continued)

OTHER PUBLICATIONS

Antunes, Jose, "Dual Pixel AF: is it a game changer for autofocus?" https:www.provideocoalition.com/production, Dec. 29, 2015.

(Continued)

*Primary Examiner* — Nasser M Goodarzi
*Assistant Examiner* — Patrick A Ryan
(74) *Attorney, Agent, or Firm* — Yudell Isidore PLLC

(57) ABSTRACT

A method, system, and computer program product for generating a three-dimensional image from a captured two-dimensional image. The method includes capturing, via a wide-angle camera sensor of an image capturing device, a two-dimensional image of a scene. The method further includes determining depth information of the scene. The method further includes generating, from the depth information, a depth map that depicts a depth of the scene in a third dimension. The method further includes generating a wide-angle three-dimensional image by merging the depth map and the two-dimensional image.

20 Claims, 13 Drawing Sheets

(51) Int. Cl.
*H04N 13/271* (2018.01)
*H04N 13/296* (2018.01)
*H04N 13/232* (2018.01)
*H04N 13/128* (2018.01)

(56) References Cited

U.S. PATENT DOCUMENTS

| | | | |
|---|---|---|---|
| 2013/0027512 A1* | 1/2013 | Aronsson | H04N 13/254 348/42 |
| 2014/0152647 A1* | 6/2014 | Tao | G06T 7/557 345/419 |
| 2017/0078653 A1* | 3/2017 | Bi | G06T 3/0062 |
| 2017/0243367 A1* | 8/2017 | Lee | G06T 7/70 |
| 2018/0176542 A1* | 6/2018 | Atanassov | G06T 7/521 |
| 2019/0007594 A1* | 1/2019 | Sato | G01S 7/4816 |

OTHER PUBLICATIONS

GSMarena, "Samsung's Dual Pixel auto focus explained and why it's the best out there right now", http://www.gsmarena.com/samsungs_dual_pixel_tech_is_like_canons_dual_pixel_auto_focus-news-16805.php, Feb. 22, 2016.

* cited by examiner

CREATING A THREE-DIMENSIONAL IMAGE VIA A WIDE-ANGLE CAMERA SENSOR

BACKGROUND

1. Technical Field

The present disclosure generally relates to electronic devices having camera sensors and in particular to a method for generating a three-dimensional image from a two-dimensional source image captured by the camera sensor.

2. Description of the Related Art

Many modern image capturing devices, such as cameras associated with cellular phones, are equipped with narrow-angle cameras that can be used to capture images and/or video in a narrow field of view. These devices are typically incapable of capturing a three-dimensional image due to hardware limitations associated with narrow-angle cameras. However, wide-angle three-dimensional images/video may be desirable to a user who wishes to capture a more immersive image and/or video. One existing solution, is a dedicated three-dimensional camera device that includes an array of cameras (e.g., 10 or more cameras), each capturing images/video in a different direction. The images captured by the array of cameras may then be stitched together to create a single panoramic or wide-angle image (e.g., a 360-degree image). However, such devices are typically quite large and it is not always sensible for a user to carry such a device. Additionally, commonly accepted size expectations of mobile devices (e.g., cellular phones) preclude having a large array of cameras.

BRIEF DESCRIPTION OF THE DRAWINGS

The description of the illustrative embodiments is to be read in conjunction with the accompanying drawings. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
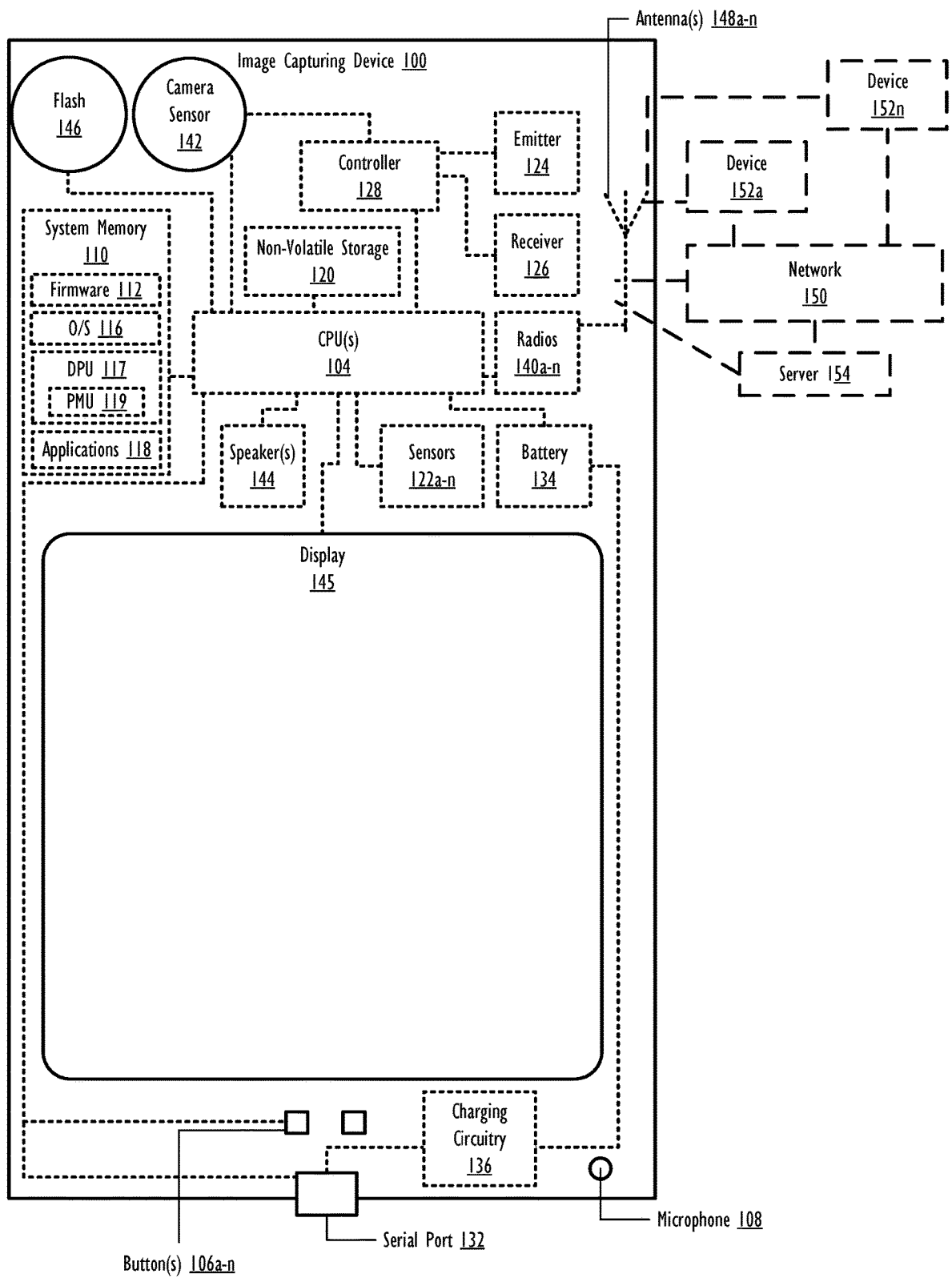
FIG. 1 illustrates an image capturing device within which certain aspects of the disclosure can be practiced, in accordance with one or more embodiments.

The illustrative embodiments provide a method, a system, and a computer program product for generating a three-dimensional image from a captured two-dimensional image. The method includes capturing, via a wide-angle camera sensor of an image capturing device, a two-dimensional image of a scene. The method further includes determining depth information of the scene. The method further includes generating, from the depth information, a depth map that depicts a depth of the scene in a third dimension. The method further includes generating a wide-angle three-dimensional image by merging the depth map and the two-dimensional image.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within image capturing device 100 are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Now turning to FIG. 1, there is illustrated an example image capturing device 100 within which one or more of the described features of the various embodiments of the disclosure can be implemented. In one embodiment, image capturing device 100 can be any electronic device that is equipped with at least one camera sensor. Example image capturing devices can include, but are not limited to, a desktop computer, a monitor, a notebook computer, a mobile phone, a digital camera, a video recorder, or a tablet computer. Image capturing device 100 includes at least one processor or central processing unit (CPU) 104. CPU(s) 104 is coupled to non-volatile storage 120 and system memory 110, within which firmware 112, operating system (OS) 116, depth processing utility (DPU) 117, and applications 118 can be stored for execution by CPU(s) 104. According to one aspect, DPU 117 executes within image capturing device 100 to perform the various methods and functions described herein. In one or more embodiments, DPU 117 generates a wide-angle three-dimensional image by merging a depth map and a captured two-dimensional image. For simplicity, DPU 117 is illustrated and described as a stand-alone or separate software/firmware/logic component, which provides the specific functions and methods described below. However, in at least one embodiment, DPU 117 may be a component of, may be combined with, or may be incorporated within firmware 112, or OS 116, and/or within one or more of applications 118.

System memory 110 may also include a power management utility (PMU) 119 for execution by CPU(s) 104. According to one aspect, PMU 119 executes within image capturing device 100 to provide power management of visible light cameras (including camera sensor 142), emitter module 124, and receiver module 126. For simplicity, PMU 119 is illustrated and described as a software/firmware/logic sub-component of DPU 117, which provides the specific functions and methods described below. However, in at least one embodiment, PMU 119 may be a component of, may be combined with, or may be incorporated within firmware 112, or OS 116, and/or within one or more of applications 118. In another embodiment, PMU 119 is a stand-alone or separate software/firmware/logic component.

As shown, image capturing device 100 may include input devices and output devices that enable a user to interface with image capturing device 100. In the illustrated embodiment, image capturing device 100 includes camera sensor(s) 142, camera flash 146, display 145, hardware buttons 106a-n, microphone(s) 108, and speaker(s) 144. Camera sensor 142 may be a color sensor (e.g., red-green-blue sensor) or a monochrome sensor. In one or more embodiments, camera sensor 142 includes a wide-angle and/or fisheye lens. For example, camera sensor 142 can have a 180° azimuthal view angle and a 90° (or greater) polar view angle. While one camera sensor is illustrated, image capturing device 100 may include multiple camera sensors, in other embodiments. Hardware buttons 106a-n are selectable buttons which are used to receive manual/tactile input from a user to control specific operations of image capturing device 100 and/or of applications executing thereon. In one embodiment, hardware buttons 106a-n may also include, or may be connected to, one or more sensors (e.g. a fingerprint scanner) and/or may be pressure sensitive. Hardware buttons 106a-n may also be directly associated with one or more functions of a graphical user interface (not pictured) and/or functions of an OS, application, or hardware of image capturing device 100. In one embodiment, hardware buttons 106a-n may include a keyboard. Microphone(s) 108 may be used to receive spoken input/commands from a user. Speaker(s) 144 is used to output audio.

CPU(s) 104 is also coupled to sensors 122a-n and display 145. Sensors 122a-n can include, but are not limited to, at least one of: infrared (IR) sensors, thermal sensors, light sensors, motion sensors and/or accelerometers, proximity sensors, and camera/image sensors. Display 145 is capable of displaying text, media content, and/or a graphical user interface (GUI) associated with or generated by firmware and/or one or more applications executing on image capturing device 100. The GUI can be rendered by CPU(s) 104 for viewing on display 145, in one embodiment, or can be rendered by a graphics processing unit (GPU) (not separately shown), in another embodiment. In one embodiment, display 145 is a touch screen that is also capable of receiving touch/tactile input from a user of image capturing device 100, when the user is interfacing with a displayed GUI. In at least one embodiment, image capturing device 100 can include a plurality of virtual buttons or affordances that operate in addition to, or in lieu of, hardware buttons 106a-n. For example, image capturing device 100 can be equipped with a touch screen interface and provide, via a GUI, a virtual keyboard or other virtual icons for user interfacing therewith.

CPU(s) 104 is also coupled to controller 128. Controller 128 can communicate instructions/commands to camera sensor 142, emitter module 124, and receiver module 126. Controller 128 can also receive data from camera sensor 142, emitter module 124, and receiver module 126. Emitter module 124 may include, for example, an infrared emitter. In one embodiment, emitter module 124 projects light over a view angle of 120 degrees. In other embodiments, emitter module 124 projects light over another view angle, including, but not limited to 45°, 90°, 150°, and 180°. In one embodiment, receiver module 126 includes an infrared receiver. In another embodiment, receiver module 126 can include, but is not limited to, an infrared receiver, a motion sensor, a camera sensor, and/or a light sensor. In one embodiment, receiver module 126 has a view angle of 120 degrees for detecting light and/or reflection of light projected by an emitter (e.g., emitter module 124) on objects within a scene. In other embodiments, receiver module 126 may be configured with another view angle, including, but not limited to 45°, 90°, 150°, and 180°. In one embodiment, controller 128 may provide specific timing for actions to be simultaneously or sequentially performed by camera sensor 142, emitter module 124, and/or receiver module 126. For example, controller 128 may synchronize a capture of image data by camera sensor 142 and a transmission of an infrared light/signal by emitter module 124 followed by a detection, by receiver module 126, of reflected light from objects within a scene. While one emitter and one receiver are illustrated, image capturing device 100 may include additional emitters, in other embodiments.

Image capturing device 100 also includes serial port 132 (e.g., a universal serial bus (USB) port), battery 134, and charging circuitry 136. Serial port 132 can operate as a charging port that receives power via an external charging device (not pictured) for charging battery 134 via charging circuitry 136. Battery 134 may include a single battery or multiple batteries for providing power to components of image capturing device 100. Serial port 132 may also function as one of an input port, an output port, and a combination input/output port. In one embodiment, battery 134 may include at least one battery that is removable and/or replaceable by an end user. In another embodiment, battery 134 may include at least one battery that is permanently secured within/to image capturing device 100.

Image capturing device 100 may also include one or more wireless radios 140a-n and can include one or more antenna(s) 148a-n that enable image capturing device 100 to wirelessly connect to, and transmit and receive voice and/or data communication to/from, one or more other devices, such as devices 152a-n and server 154. As a wireless device, image capturing device 100 can transmit data over a wireless network 150 (e.g., a Wi-Fi network, cellular network, Bluetooth® network (including Bluetooth® low energy (BLE) networks), a wireless ad hoc network (WANET), or personal area network (PAN)). In one embodiment, image capturing device 100 may be further equipped with infrared (IR) device (not pictured) for communicating with other devices using an IR connection. In another embodiment, wireless radios 140a-n may include a short-range wireless device, including, but not limited to, a near field communication (NFC) device. In still another embodiment, image capturing device 100 may communicate with one or more other device(s) using a wired or wireless USB connection.

Figure 2:
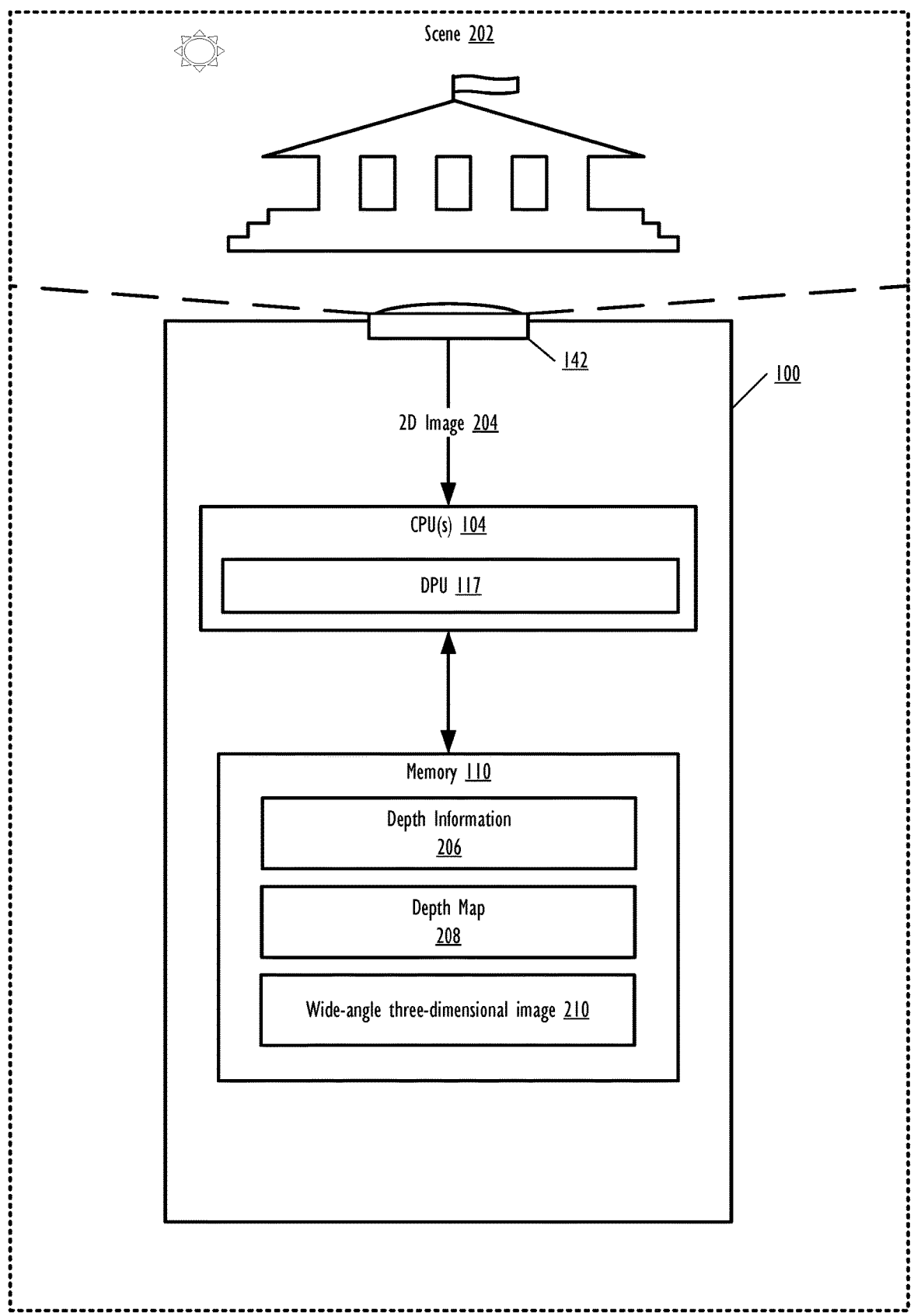
FIG. 2 illustrates an example image capturing device configured to generate a three-dimensional image, in accordance with one or more embodiments.

FIG. 2 is a block diagram illustrating additional functional components within example image capturing device 100, which is configured to generate a three-dimensional image, in accordance with one or more embodiments of the present disclosure. As illustrated, image capturing device 100 includes CPU(s) 104, memory 110, and camera sensor 142. In one or more embodiments, camera sensor 142 is used to capture two-dimensional (2D) image 204, in example scene 202. In one embodiment, CPU(s) 104 executes DPU 117 to determine/calculate depth information 206, which describes a depth at each pixel of scene 202. CPU(s) 104 further executes DPU 117 to calculate depth map 208, based on depth information 206. Depth map 208 is a visual representation that depicts a depth of the scene in a third dimension that is not captured by 2D image 204 (e.g., depth along a z-axis). CPU(s) 104 further executes DPU 117 to generate wide-angle three-dimensional (3D) image 210 by aligning/merging 2D image 204 with depth map 208. Wide-angle 3D image 210 is then provided to memory 110. In other embodiments, wide-angle 3D image 210 may be provided to a storage (e.g., non-volatile storage 120) and/or at least one output device (e.g., display 145).

In one or more embodiments, DPU 117 further includes PMU 119, which is executed by CPU(s) 104 executes to provide tracking, via camera sensor 142, of activity occurring within a vicinity of image capturing system 100. In one embodiment, image capturing device 100 is placed in a low power state. During the low power state, a visible sensor (e.g., camera sensor 142) monitors scene 202 within a field of view, at a low frame rate (e.g., 1 frame per second), for changes in ambient light. In one or more embodiments, changes in ambient light may be indicative of movement in the scene, which requires additional monitoring in scene 202 to ensure camera sensor 142 is ready to capture images. Additionally, during the low power state, all depth-sensing emitters and receivers (e.g., emitter module 124 and receiver module 126) of data processing system 100 are powered off.

In response to detecting a change in ambient light, CPU(s) 104 applies a moderate power state to the visible sensor that causes the visible sensor to (1) analyze scene 202 for regions of interest and (2) to periodically monitor scene 202 at a low frame rate (e.g., 1 frame per second) for further changes in ambient light. During the moderate power state, all depth-sensing emitters and receivers (e.g., emitter module 124 and receiver module 126) of data processing system 100 are powered off. In response to analyzing scene 202, CPU(s)

104 determines whether a particular object is detected within the determined regions of interest. In one embodiment, the particular object is any object to enter the field of view. In another embodiment, the particular object is a predefined and/or predetermined object. In response to failing to detect the particular object within the determined regions of interest, CPU(s) 104 determines whether the changes in ambient light in the regions of interest have stopped and/or whether all motion has stopped within the regions of interest. In response to determining the changes in ambient light in the regions of interest have stopped, CPU(s) 104 reconfigures image capturing system 100 in the low power state. In response to determining the changes in ambient light in the regions of interest have not stopped, CPU(s) 104 re-analyzes scene 202 to determine whether the specific objects are now present within the regions of interest.

In response to detecting a particular object within the determined regions of interest during the moderate power state, CPU(s) 104 applies a high-power state to the visible sensor and all depth-sensing emitters and receivers. During the high-power state, the visible sensor and all depth-sensing emitters and receivers are used to analyze the regions of interest, or optionally the full field of view, at a high frame rate (e.g., 30 frames per second) to determine whether the changes in ambient light and/or all detected motion has stopped. In one embodiment, CPU(s) 104 may automatically trigger a capture of at least one image by camera sensor(s) 142 in response to determining, during the high-power state, that the changes in the ambient light and/or motion in the regions of interest is still occurring. In another embodiment, in response to determining, during the high-power state, that the changes in the ambient light and/or motion in the regions of interest is still occurring, CPU(s) 104 may apply an active state to image capturing device 100, in which one or more components (e.g., the visible sensor and all depth-sensing emitters and receivers) are fully active. In response to determining the changes in ambient light and/or all detected motion has stopped, CPU(s) 104 places image capturing system 100 in the low power state.

Figure 3:
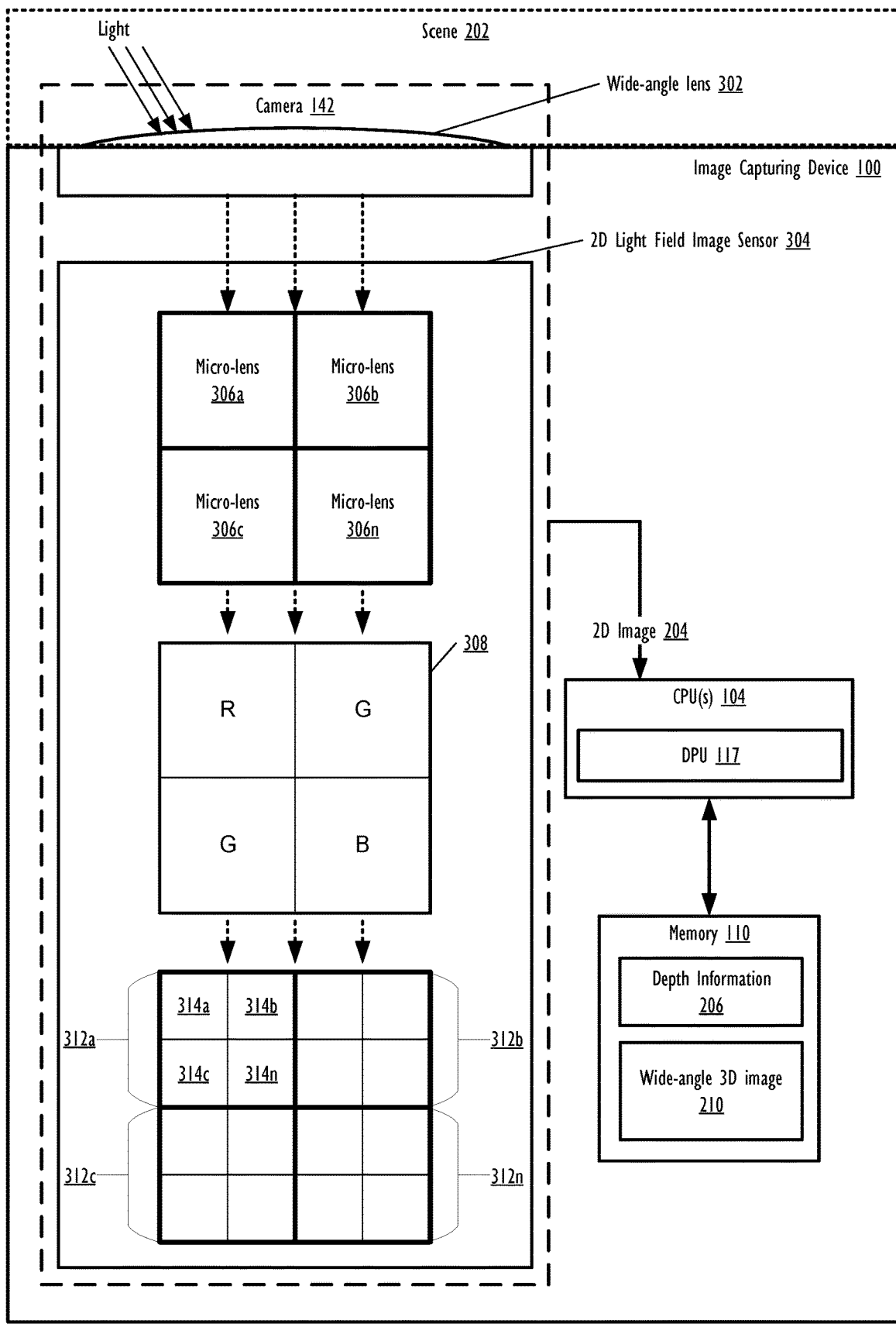
FIG. 3 illustrates a first example image capturing device having at least one wide-angle camera sensor including a two-dimensional light-field image sensor, in accordance with a first embodiment of the disclosure.
Figure 4:
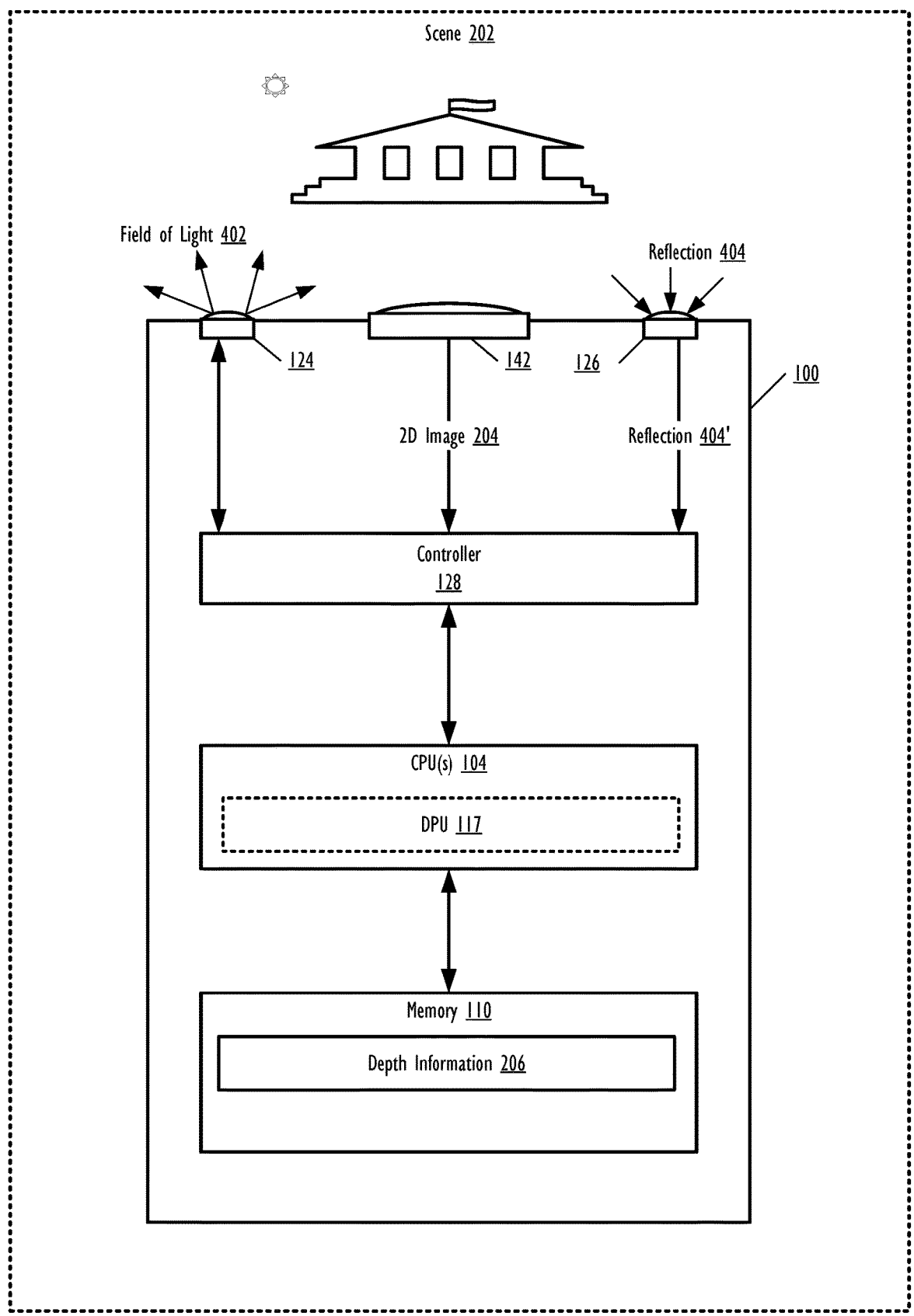
FIG. 4 illustrates a second example image capturing device configured with at least one emitter module for projecting a field of light and a time-of-flight receiver module, in accordance with a second embodiment of the disclosure.
Figure 5:
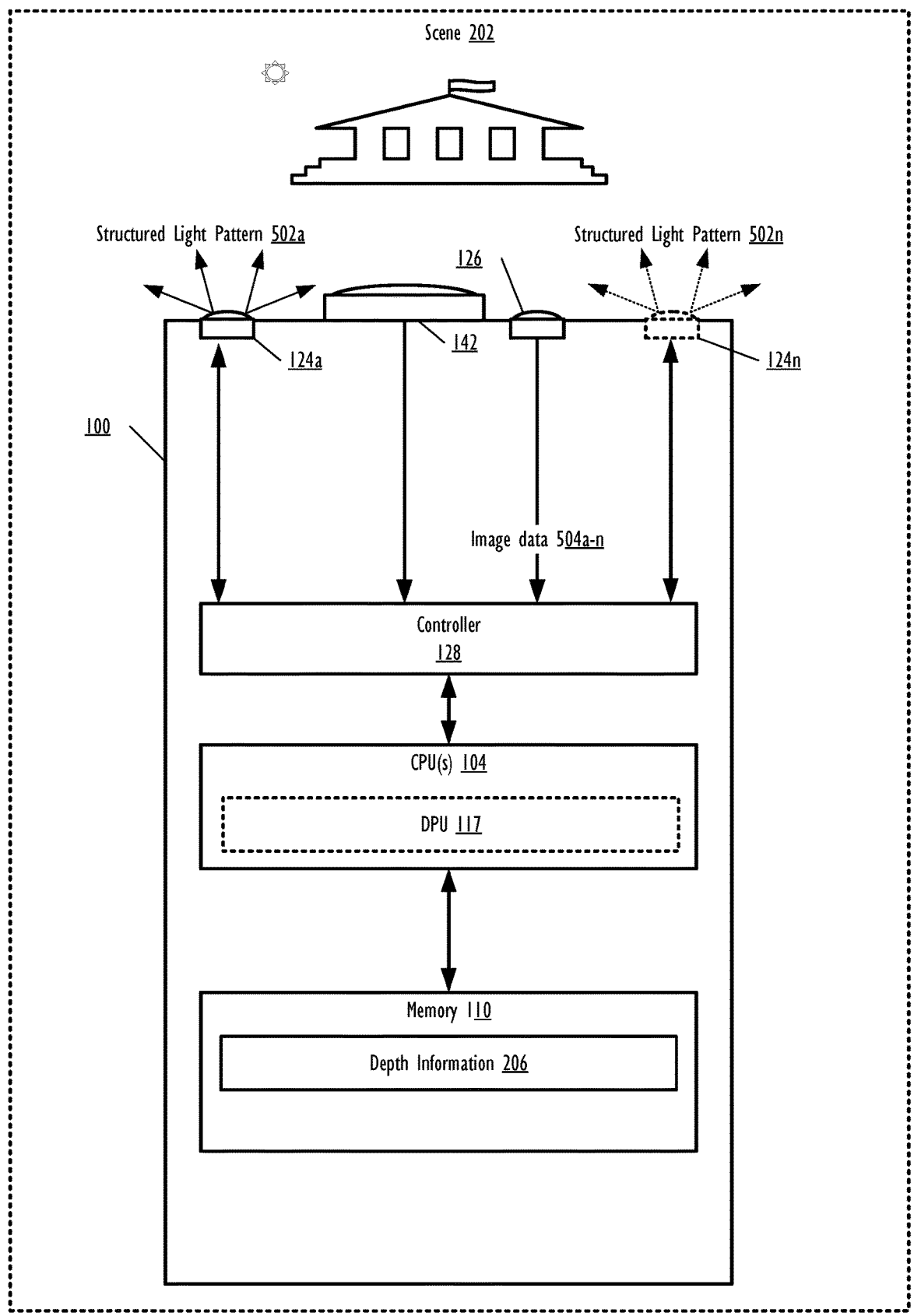
FIG. 5 illustrates a third example image capturing device configured with at least one emitter module for projecting a structured light pattern and a receiver module, in accordance with a third embodiment of the disclosure.

FIGS. 3-5, described below, illustrate different embodiments by which image capturing device calculates and/or determines depth information 206. Depth information 206 defines a depth of each pixel of a 2D image (e.g., 2D image 204) and is utilized by CPU(s) 104 to generate depth map 208. CPU(s) 104 then generates wide-angle 3D image 210 by merging depth map 208 and 2D image 204. FIGS. 3-5 are described with reference to the components of FIGS. 1-2.

Referring now to FIG. 3, there is illustrated a first example image capturing device 100 comprising a single camera (camera sensor 142), memory 110, and CPU(s) 104. In one or more embodiments, CPU(s) 104 executes DPU 117 for determining depth information 206, in accordance with a first embodiment of the disclosure. In this embodiment, CPU(s) 104 receives a single 2D image (2D image 204) captured by camera sensor 142 and determines a depth at each super-pixel of camera sensor 142 based on the 2D image. Camera sensor 142 includes wide angle lens 302 that focuses light onto two-dimensional (2D) light field image sensor 304.

Two-dimensional light-field image sensor 304 includes an array of micro-lenses 306a-n arranged in a quadrilateral pattern. In capturing an image, micro-lenses 306a-n receive light from wide-angle lens 302 and focus the light on to a plurality of super-pixels covered by a color filter array (CFA) 308. CFA 308 separates colored light from micro-lenses 306a-n into individual colors which are captured by sub-pixels 314a-n within super-pixels 312a-n. In the illustrated embodiment, CFA 308 is a Red-Green-Green-Blue (RGGB) Bayer color filter. In other embodiments, CFA 308 can include, but is not limited to, a red green blue white (RGBW) color filter, cyan yellow green magenta (CYGM) color filter, or red green blue emerald (RGBE) color filter. Each micro-lens (e.g., micro lens 306a) covers a single super-pixel (e.g., super-pixel 312a) that comprises an array of sub-pixels (e.g., sub-pixels 314a-n). Each super-pixel 312 is covered by a single color of CFA 308. For example, super-pixel 312a (which includes sub-pixels 314a-n) is covered by a red portion of CFA 308, as illustrated. In the illustrated embodiment, the sub-pixel array of each super-pixel is arranged in a 2×2 square pattern. However, in other embodiments, micro-lenses 306a-n can be arranged in a larger array (e.g., 3×3 pattern or 4×4 pattern) or in rectangular array (e.g., a 1×2 pattern or 2×1 pattern). In response to capturing 2D image 204, camera sensor 142 provides 2D image 204 as an output to CPU(s) 104. In other embodiments, 2D image 204 may be provided as an output to a buffer or memory (e.g., memory 110) that is accessible by CPU(s) 104. It should be noted that in the illustrated embodiment of FIG. 3, four micro-lenses, and a single RGGB CFA grid, and four super-pixels are depicted purely for illustrative purposes. In one or more embodiments, 2D light field image sensor 304 may include a large number (hundreds, thousands, or millions) of micro-lenses and/or super-pixels.

For horizontal sub-pixels 314a-n, during capture of 2D image 204, light captured by the left side of wide-angle lens 302 is primarily captured by the left sub-pixels (e.g., sub-pixel 314a and sub-pixel 314c) of a super-pixel (e.g., super pixel 312a) and light captured by the right side of wide-angle lens 302 is primarily captured by the right sub-pixels (e.g., sub-pixel 314b and sub-pixel 314n). Similarly, for vertical sub-pixels 314a-n, light captured by the top side of wide-angle lens 302 is primarily captured by the top sub-pixels (e.g., sub-pixel 314a and sub-pixel 314b) and light captured by the bottom side of wide-angle lens 302 is primarily captured by the bottom sub-pixels (e.g., sub-pixel 314c and sub-pixel 314n). In response to receiving 2D image 204, CPU(s) 104 determines, for each super-pixel 312a-n, an amount of light in each sub-pixel 314a-n. In one or more embodiments, CPU(s) 104 individuals reads the amount of light (also referred to herein as color value) from each sub-pixel.

The amount of light in adjacent sub-pixels (e.g., sub-pixel 314a and sub-pixel 314b) in a particular direction (e.g., horizontal) can then be compared. If the amount of light in adjacent sub-pixels is equivalent (there is zero phase error), a depth of a corresponding object in scene 202 is at the exact focus point of the camera sensor 142. However, for objects not at the exact focus point of the camera sensor 142, light captured by wide-angle lens 302 will be defocused and will not fall directly on to a single super-pixel (e.g., super-pixel 312a), but rather will fall partially or completely on to neighboring super-pixels (e.g., super-pixel 312b). For super-pixels 312a-n, CPU(s) 104 determines a phase difference (which may be positive or negative) in the horizontal direction by linearly correlating the light captured by each left sub-pixel (sub-pixel 314a and sub-pixel 314c) with light collected by each right sub-pixel (sub-pixel 314b and 314n) across the array of super-pixels. Based on the determined phase difference of each super-pixel 312a-n, CPU(s) 104 calculates a depth difference based on horizontal phase data of a corresponding object in scene 202 relative to the focus point of camera sensor 142.

Similarly, CPU(s) 104 determines a phase difference in the vertical direction by linearly correlating the light captured by each top sub-pixel (sub-pixel 314a and sub-pixel 314b) with light collected by each bottom sub-pixel (sub-pixel 314c and 314n). Based on the determined phase difference of each super-pixel 312a-n, CPU(s) 104 calculates a depth difference based on vertical phase data of a corresponding object in scene 202 relative to the focus point of camera sensor 142. It should be noted that in embodiments where a super-pixel is arranged in an array having pixels in a particular direction (e.g., a 2×1 array), depth-sensing may only be performed in a single (e.g., horizontal) direction.

It should be noted that in one or more embodiments, CPU(s) 104 reads the data of each super-pixel 312a-n in a binning mode. In a first example, in a super pixel having a 2×2 sub-pixel array, CPU(s) 104 can utilize binning in the horizontal direction and determine one-dimensional depth information based on the amount of light in sub-pixels 314a-n in a vertical direction. In a second example, in a super pixel having a larger sub-pixel array (e.g., a 4×4 sub-pixel array), CPU(s) 104 can perform a partial binning in the horizontal and vertical directions and determine two-dimensional depth information based on the amount of light in sub-pixels 314a-n in the horizontal and vertical directions.

The determined depth at each super-pixel 312a-n, which includes either one-dimensional depth or two-dimensional depth (based on whether sub-pixels 314a-n are arranged in one or two dimensions), is then stored as depth information 206. In one or more embodiments, a depth at a particular super-pixel may further be determined by averaging a phase value of a plurality of proximate super-pixels. Proximate super-pixels are super-pixels that are directly adjacent to, or within a predetermined distance of, the particular super-pixel. In response to determining depth information 206, CPU(s) 104 can calculate depth map 208 based on depth information 206.

Referring now to FIG. 4, there is illustrated a second example image capturing device configured with at least one emitter module for projecting a field of light and a time-of-flight receiver module, in accordance with a second embodiment of the disclosure. Image capturing device 100 includes camera sensor 142 having a wide-angle lens, controller 128, at least one emitter module (emitter module 124) for projecting an infrared field of light 402 (or light pulse) towards scene 202, and an infrared time-of-flight receiver module (receiver module 126) for receiving reflection 404 of the field of light 402 from objects in scene 202, as described in greater detail below. In one or more embodiments, camera sensor 142 is a wide-angle camera sensor, emitter module 124 is a wide-angle emitter module, and receiver module 126 is a wide-angle receiver module, each having a wide-angle lens. In one or more embodiments, camera sensor 142, emitter module 124, and receiver module 126 each have a same make/type of wide-angle lens. In one or more embodiments, camera sensor 142, emitter module 124, and receiver module 126 are configured on a same side of image capturing device 100. In one example, camera sensor 142, emitter module 124, and receiver module 126 may be aligned along a same baseline/axis near the top of a front face of image capturing device 100.

Controller 128 synchronizes the capture of 2D image 204 by camera sensor 142, the projection of field of light 402 by emitter module 124, and the capture of reflection 404 by receiver module 126. In one embodiment, controller 128 modulates the field of light 402 projected by emitter module 124 throughout the entirety of scene 202 at a high rate. It should be noted that in one or more embodiments, field of light 402 may include light at multiple frequencies. For example, controller 128 may modulate a first field of light at a lower frequency (for detecting objects further away) and a second field of light at a higher frequency (for detecting objects closer to image capturing device 100). In response to emitter module 124 projecting field of light 402, receiver module 126 receives reflection 404. CPU(s) 104 measures an amplitude and an associated phase shift of the modulated light in reflection 404 relative to the field of light 402. For example, CPU may measure an 8-nanosecond phase shift between reflection 404 and field of light 402. Based on the detected phase difference, CPU(s) calculates a depth of objects in the scene at each pixel of the field of light. In another embodiment, controller 128 projects, via emitter module 124, field of light 402 within scene 202 and precisely times the capture of reflection 404 by receiver module 126. CPU(s) 104 then calculates the depth of objects in the scene at each pixel based on the speed of light (i.e., 299,792,458 meters per second) and the measured time delay between the projection of field of light 402 by emitter module 124 and the capture of reflection 404 at receiver module 126. The calculated depth at each pixel in scene 202 is then stored as the depth information 206. CPU(s) 104 can then determine depth map 208 based on depth information 206.

In one or more embodiments, the resolution of field of light 402 is less than the resolution of 2D image 204. In response to determining the resolution of field of light 402 is less than the resolution of 2D image 204, CPU(s) 104 may upscale the resolution of depth information 206 to match the resolution of 2D image 204. In another embodiment, CPU(s) 104 may upscale the resolution of depth map 208 to match the resolution of 2D image 204 prior to merging depth map 208 with 2D image 204.

In one or more embodiments, emitter module 124 includes a plurality of emitter modules. In one such embodiment, CPU(s) 104 may automatically project a field of light via a secondary emitter module in response to determining a reflection of a field of light projected by a particular emitter module is not being received by receiver module 126. For example, it may be possible for a user to inadvertently cover a primary emitter module when capturing an image with image capturing device 100. In response to determining a reflection of a field of light projected by a primary emitter module (e.g., a top or a side of image capturing device) is not being received, CPU(s) 104 may instead project the field of light by a secondary emitter module physically located in another location (e.g., the bottom of the same side) of image capturing device 100. In another embodiment, CPU(s) 104 may simultaneously project a same or different field of light by multiple emitters. In another embodiment, a second emitter may be used to ensure the entire field of view is covered by the field of light. For example, in some instances receiver module 126 (or another object) may physically extend above a surface of the device (e.g., a raised receiver) causing a portion of the field of light emitted by the first emitter to be partially blocked. A second emitter can be used to emit a second field of light into scene 202 to ensure those occluded areas are covered by the second field of light projected.

Referring now to FIG. 5, there is illustrated a third example image capturing device 100 configured with at least one emitter module for projecting a structured light pattern and a receiver module, in accordance with a third embodiment of the disclosure. Image capturing device 100 includes camera sensor 142 having a wide-angle lens, controller 128, at least one emitter module (emitter module(s) 124a-n) having a patterned mask for projecting a structured/coded light pattern (structured light pattern 502a) towards scene 202, and a receiver module (receiver module 126) for recording image data (image data 504a) of the scene with the structured light pattern of the at least one emitter module superimposed thereon. In one or more embodiments, the structured light projected by emitter module(s) 124a-n is an infrared light pattern. In one or more embodiments, camera sensor 142, emitter module(s) 124, and receiver module 126 are physically proximate and are configured with an identical wide-angle lens for viewing a same field of view of scene 202.

In one embodiment, image capturing device 100 includes a single emitter module (emitter module 124a). Controller 128 synchronizes the capture of 2D image 204 by camera sensor 142 and the projection of structured light pattern 502a by emitter module 124a, and the capture of image data 504a (which includes scene 202 with structured light pattern 502a superimposed thereon) by receiver module 126. In response to receiving image data 504a, CPU(s) 104 analyzes a distortion of structured light pattern 502a at each pixel in image data 504. Based on the determined distortion of structured light pattern 502a at a pixel, CPU(s) 104 calculates a corresponding depth of an object in the scene at that pixel. The calculated depth at each pixel in scene 202 is then stored as the depth information 206. CPU(s) 104 can then generate depth map 208 based on depth information 206.

In another embodiment, image capturing device 100 is configured with a second emitter module (emitter module 124n). In this embodiment, controller 128 projects structured light pattern 502a by emitter module 124a within a first time interval. During the first time interval, receiver module 126 synchronizes the capture of image data 504a (which includes scene 202 with structured light pattern 502a superimposed thereon). Controller 128 also projects, during a second time interval that is different from the first time interval, a second structured light pattern (structured light pattern 502n) by emitter module 124n. During the second time interval, receiver module 126 synchronizes the capture of second image data 504n (which includes scene 202 with structured light pattern 502n superimposed thereon).

In response to receiving image data 504a-n, CPU(s) 104 analyzes (1) a distortion of structured light pattern 502a at each pixel in image data 504a and (2) a distortion of structured light pattern 502n at each pixel in image data 504n. CPU(s) 104 calculates corresponding depth of an object at each pixel of structured light patterns 502a-n. The depth data generated by image data 504a-n is then combined. The calculated depth at each pixel in scene 202 is then stored as the depth information 206. CPU(s) 104 can then generate depth map 208 based on depth information 206.

In another embodiment, if a pixel in image data 504a and a pixel in image data 504n are determined to be at a same location in scene 202, CPU(s) 104 may replace, within depth information 206, the two determined depth measurements at that pixel with an average of the two determined depth measurements.

In another embodiment, emitter module 124a is arranged on image capturing device 100 with receiver module 126 along a first baseline, and emitter module 124n is arranged with receiver module 126 along a second baseline that is not parallel to the first baseline. For example, emitter module 124a and emitter module 124n can be arranged with receiver module 126 on a same side/face of image capturing device 100 along separate axes. By arranging emitter module 124a and emitter module 124n on separate non-parallel baselines, emitter modules 124a-n can project structured light patterns 502a-n within scene 202 such that every point in the field of view captured by receiver module 126 has a non-zero baseline for triangulation measurements with either emitter module 124a or emitter module 124n. In one embodiment, the baselines for emitter module 124a and emitter module 124n relative to receiver module 126 are orthogonal.

Figure 6:
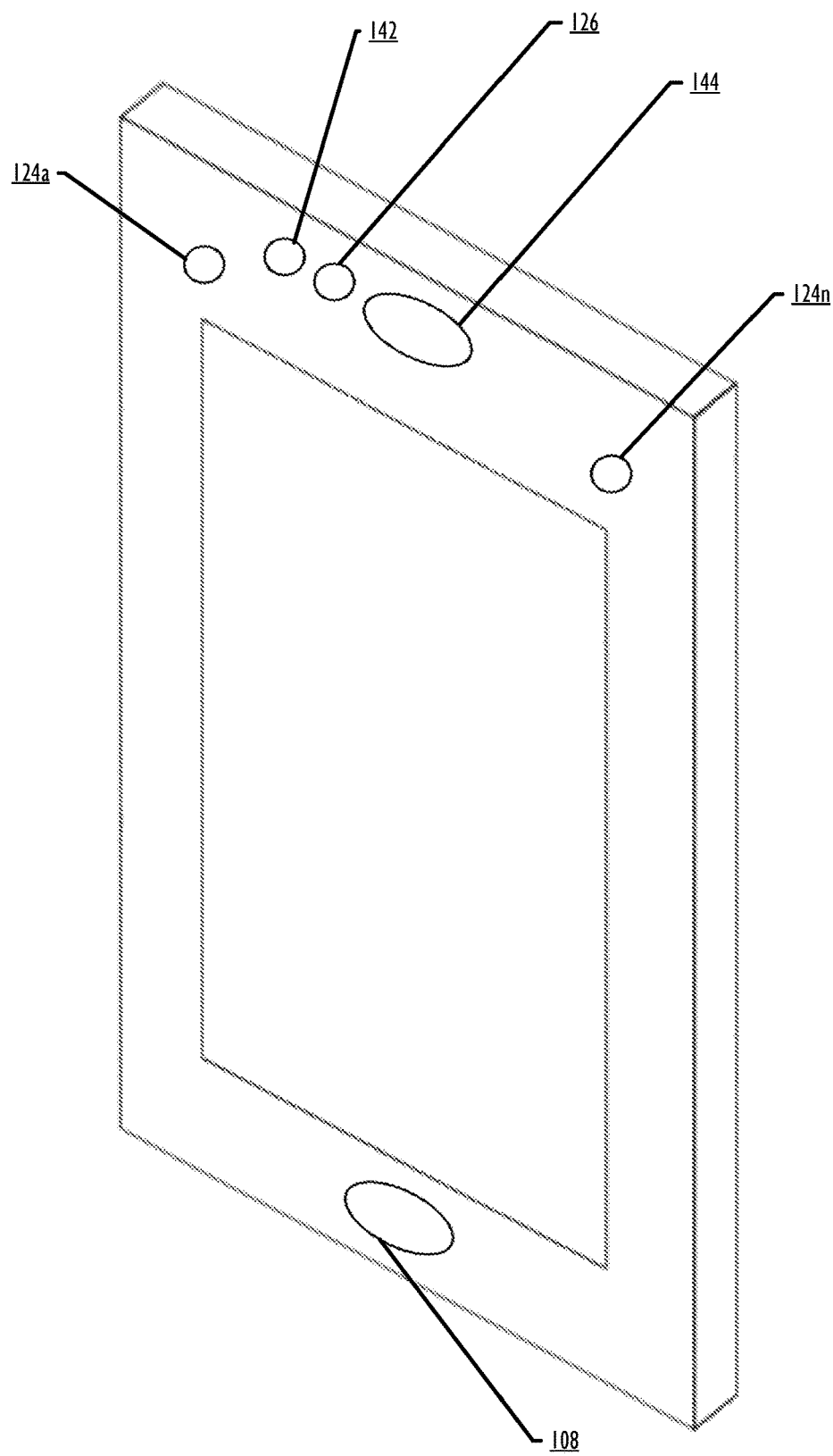
FIG. 6 illustrates a third example image capturing device configured with two emitter modules for projecting structured light patterns and a receiver module, in accordance with the third embodiment of the disclosure.

Referring now to FIG. 6, there is illustrated an example image capturing device configured with two emitter modules for projecting structured light patterns and a receiver module for recording image data (image data 504a) of the scene with the structured light patterns superimposed thereon, in accordance with a third embodiment of the disclosure. As illustrated, emitter module 124a is located in a top left corner of a front side of image capturing device 100 along a first baseline with receiver module 126. Emitter module 124n is located in a top right corner of the front side of image capturing device 100 along a second baseline with receiver module 126. Thus, every point in the field of view captured by receiver module 126 has a non-zero baseline for triangulation measurements with either emitter module 124a or emitter module 124n. While emitter module 124a and emitter module 124n have a non-orthogonal alignment to receiver module 126 in the illustrated example, in other embodiments, emitter module 124a and emitter module 124n can have an orthogonal alignment to receiver module 126.

Referring again to FIG. 5, in one or more embodiments, the resolution of structured light patterns 502a-n is less than the resolution of 2D image 204. In response to determining the resolution of structured light patterns 502a-n is less than the resolution of 2D image 204, CPU(s) 104 may upscale the resolution of depth information 206 to match the resolution of 2D image 204. In another embodiment, CPU(s) 104 may upscale the resolution of depth map 208 to match the resolution of 2D image 204 prior to merging depth map 208 with 2D image 204.

Figure 7:
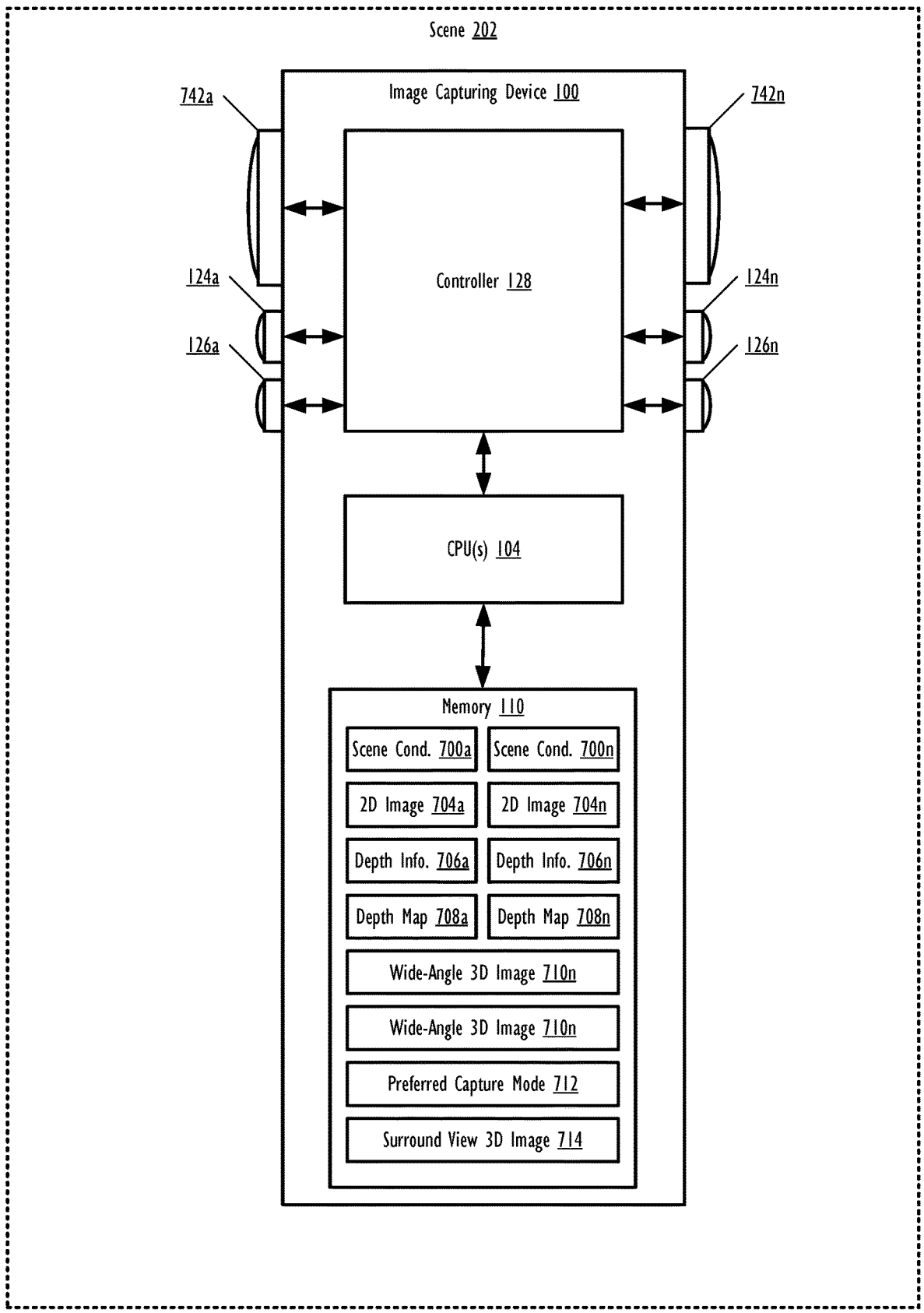
FIG. 7 illustrates an example image capturing device for generating a surround view, three-dimensional image, in accordance with one or more embodiments.

Referring now to FIG. 7, there is illustrated image capturing device comprising wide-angle camera sensors, emitter modules, and receiver modules on at least two sides for generating a surround view three-dimensional image, in accordance with one or more embodiments of the disclosure. Image capturing device 100 includes camera sensors 742a-n, controller 128, CPU(s) 104, and memory 110. In one or more embodiments, camera sensors 742a-n are each same/identical model camera sensor. In one or more embodiments, each side of image capturing device 100 may also include at least one emitter module (e.g. emitter module 124a or 124n) and a receiver module (e.g., receiver module 126a or 126n). In one embodiment, camera sensors 742a-n each have a 360° azimuthal view angle and a 40-120° (or greater) polar view angle.

Image capturing device 100 analyzes scene conditions 700a-n within scene 202 via camera sensors 742a-n. Scene conditions 700a-n describe an ambient light and/or focus point of a corresponding portion of scene 202 associated with a corresponding camera sensor 742a-n. Based on determined scene conditions 700a-n, CPU(s) 104 determines preferred capture mode 712, which establishes an optimal camera configuration for capturing 2D image 704a by camera sensor 742a and 2D image 704n by camera sensor 742n. For example, preferred captured mode 712 may establish a white balance, exposure level, focusing condition, or International Organization for Standardization (ISO) capture setting. In one embodiment, preferred capture mode 712 may be determined by averaging various conditions identified within scene conditions 700a-n. In another embodiment, preferred capture mode 712 is a sub-optimal capture mode for one or both of cameras 742a-n, but represents a best single mode for capturing 2D images 704a-n based on scene conditions 700a-n.

In response to determining preferred captured mode 712, CPU(s) 104 applies preferred captured mode 712 to camera sensors 742a-n and captures two-dimensional (2D) images 704a-n by camera sensors 742a-n, respectively. CPU(s) 104 further executes DPU 117 to determine/calculate depth information 706a-n associated with 2D images 704a-n by any of the methods described in FIGS. 3-5, above. In response to determining depth information 706a-n, CPU(s) 104 further executes DPU 117 to calculate, based on depth information 706a-n, depth maps 708a-n for camera sensors 742a-n. In response to capturing 2D images 704a-n and calculating depth maps 708a-n, CPU(s) 104 further executes DPU 117 to generate (1) wide-angle 3D image 710a by aligning/merging depth map 708a and 2D image 704a and (2) wide-angle 3D image 710n by aligning/merging depth map 708n and 2D image 704n. CPU(s) 104 then combines wide-angle 3D image 710a and wide-angle 3D image 710n to create surround view 3D image 714, that captures scene 202 in circumferential view along an azimuth axis. In one embodiment, is a full 360° 3D image along a horizontal axis and has a 90° (or greater) view angle along a polar axis. In another embodiment, is a full 360° 3D image along a horizontal axis and has a 180° view angle along a polar axis. Surround view 3D image 714 is then provided to memory 110. In other embodiments, surround view 3D image 714 may be provided to a storage (e.g., non-volatile storage 120) and/or at least one output device (e.g., display 145).

Figure 8:
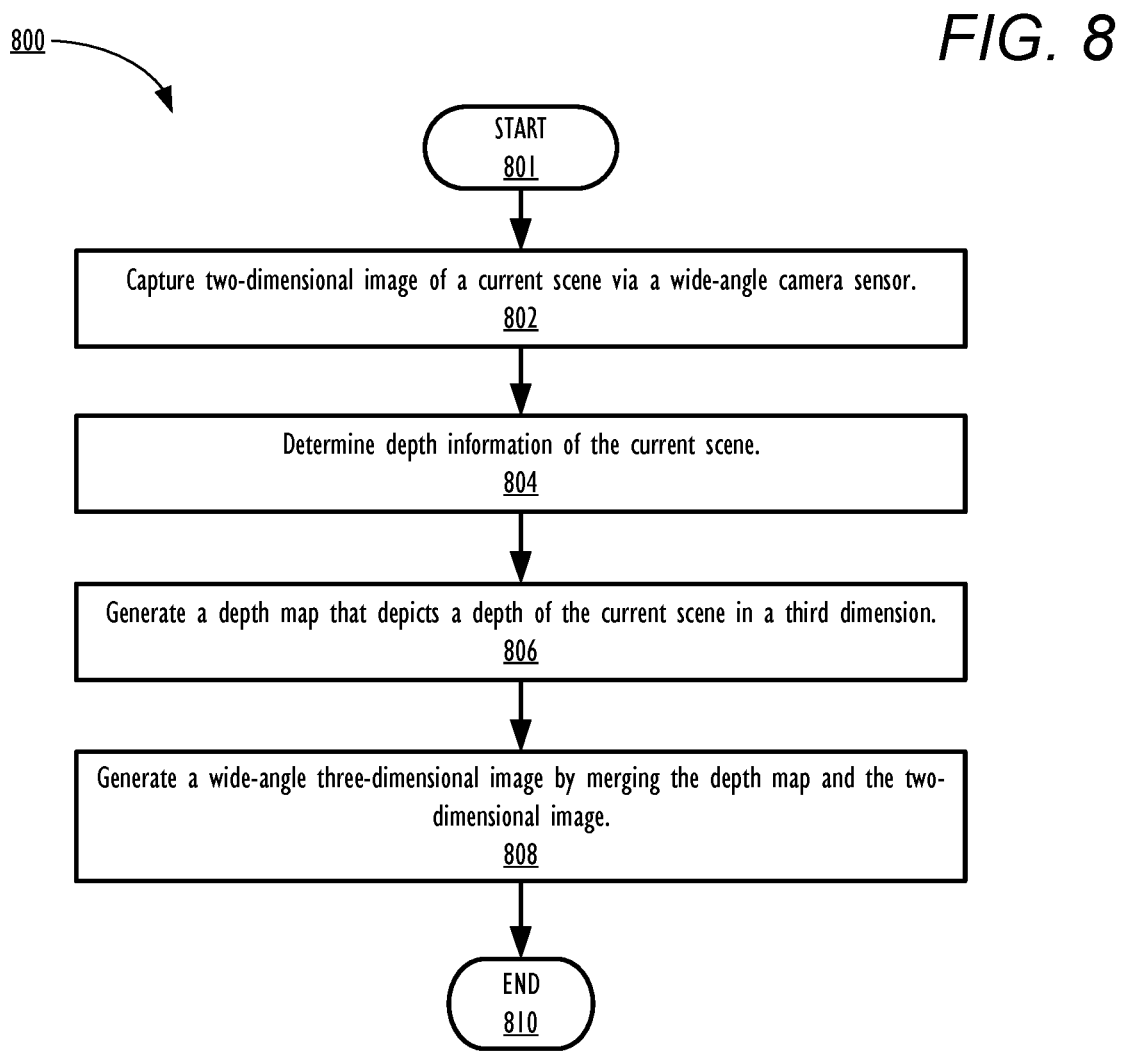
FIG. 8 is a flow chart illustrating a method for generating a wide-angle three-dimensional image by merging a depth map and a captured two-dimensional image, in accordance with one or more embodiments.

Referring now to FIG. 8, there is depicted a high-level flow-chart illustrating a method for generating a wide-angle three-dimensional image by merging a depth map and a captured two-dimensional image, in accordance with one or more embodiments of the present disclosure. Aspects of the method are described with reference to the components of FIGS. 1-2. Several of the processes of the method provided in FIG. 8 can be implemented by a processor (e.g., CPU(s) 104) executing software code of DPU 117 within an image capturing device (e.g., image capturing device 100). The method processes described in FIG. 8 are generally described as being performed by components of image capturing device 100.

Method 800 commences at initiator block 801 then proceeds to block 802. At block 802, a wide-angle camera sensor (camera sensors 142) captures a 2D image (2D image 204) of scene 202. At block 804, CPU(s) 104 determines depth information 206 of scene 202. At block 806, CPU(s) 104 generates, from depth information 206, a depth map 208 that depicts a depth of current scene 202 in a third dimension not captured by 2D image 204. At block 808, CPU(s) 104 generates a wide-angle 3D image (wide-angle 3D image 210) by aligning/merging depth map 208 and 2D image 204. Method 800 then terminates at block 810.

Figure 9:
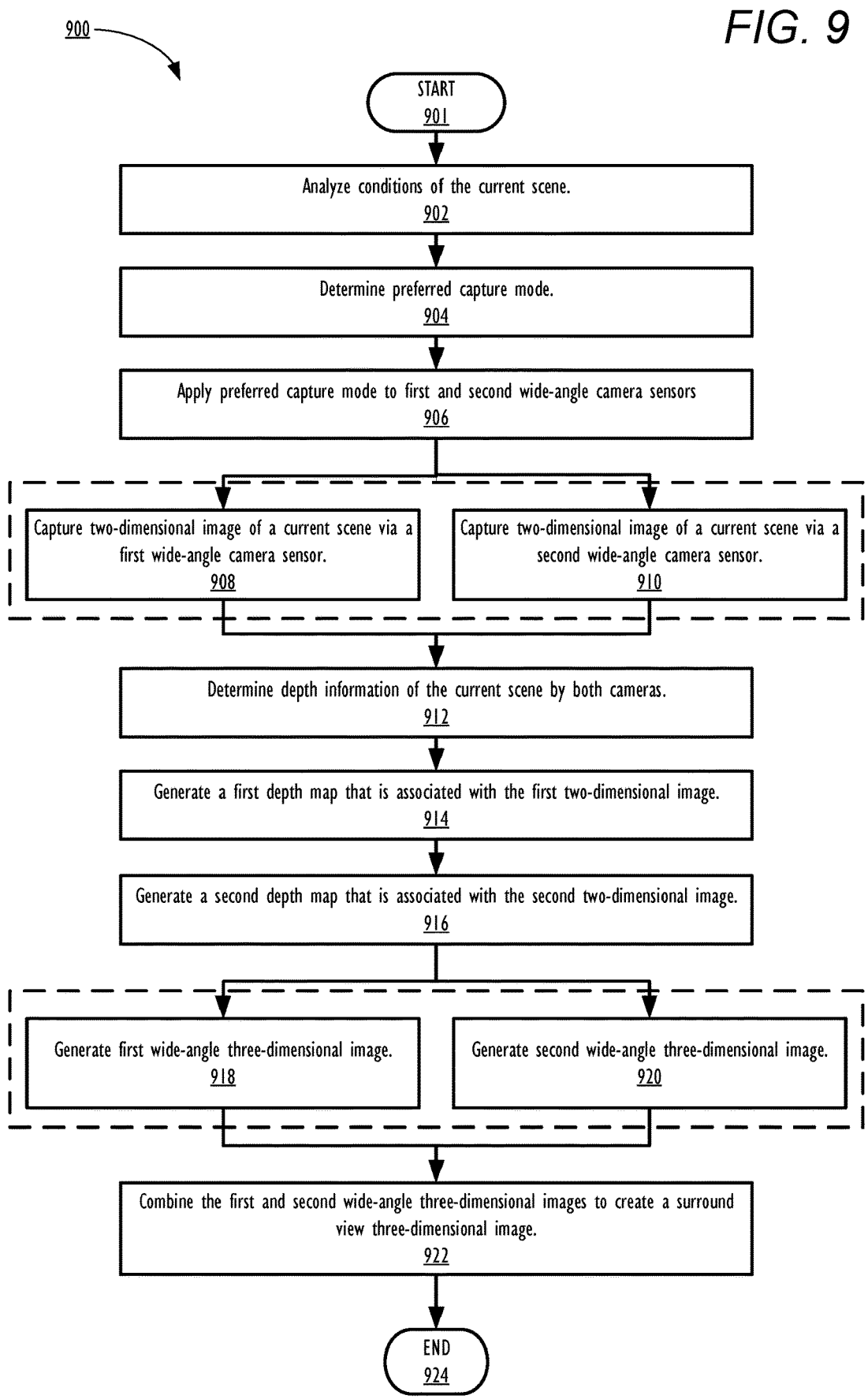
FIG. 9 is a flow chart illustrating a method for generating a surround view, wide-angle, three-dimensional image by merging first and second wide-angle three-dimensional images, in accordance with one or more embodiments.

Referring now to FIG. 9, there is depicted a high-level flow-chart illustrating a method for generating a surround view three-dimensional image by an image capturing device having cameras on at least two opposite sides, in accordance with one or more embodiments of the present disclosure. Aspects of the method are described with reference to the components of FIGS. 1 and 7. Several of the processes of the method provided in FIG. 9 can be implemented by a processor (e.g., CPU(s) 104) executing software code of DPU 117 within an image capturing device (e.g., image capturing device 100). The method processes described in FIG. 9 are generally described as being performed by components of image capturing device 100.

Method 900 commences at initiator block 901 then proceeds to block 902. At block 902, CPU(s) 104 analyzes current scene 202 via camera sensors 742a-n to determine scene conditions 700a-n. Based on scene conditions 700a-n, CPU(s) 104 determines preferred capture mode 712 (block 904). At block 906, CPU(s) 104 applies preferred capture mode 712 to both cameras 742a-n. At block 908, camera sensor 742a captures 2D image 704a within a first portion of scene 202. At block 910, camera sensor 742n contemporaneously captures 2D image 704n within a second portion of scene 202. At block 912, CPU(s) 104 determines depth information (depth information 706a) associated with 2D image 704a and depth information (depth information 706n) associated with 2D image 704n. At block 914, CPU(s) 104 generates, from depth information 706a, a first depth map 708a that depicts a depth of the first portion of scene 202 in a third dimension that is not captured by 2D image 704a. At block 916, CPU(s) 104 generates, from depth information 706n, a second depth map 708n that depicts a depth of the second portion of scene 202 in a third dimension that is not captured by 2D image 704n.

At block 918, CPU(s) 104 generates a first wide-angle 3D image (wide-angle 3D image 710a) by aligning/merging first depth map 708a and 2D image 704a. At block 920, CPU(s) 104 contemporaneously generates a second wide-angle 3D image (wide-angle 3D image 710n) by aligning/merging second depth map 708n and 2D image 704n. At block 922, CPU(s) 104 generates surround view 3D image 714 by combining/merging wide-angle 3D images 710a-n. Method 900 then terminates at block 924.

Figure 10:
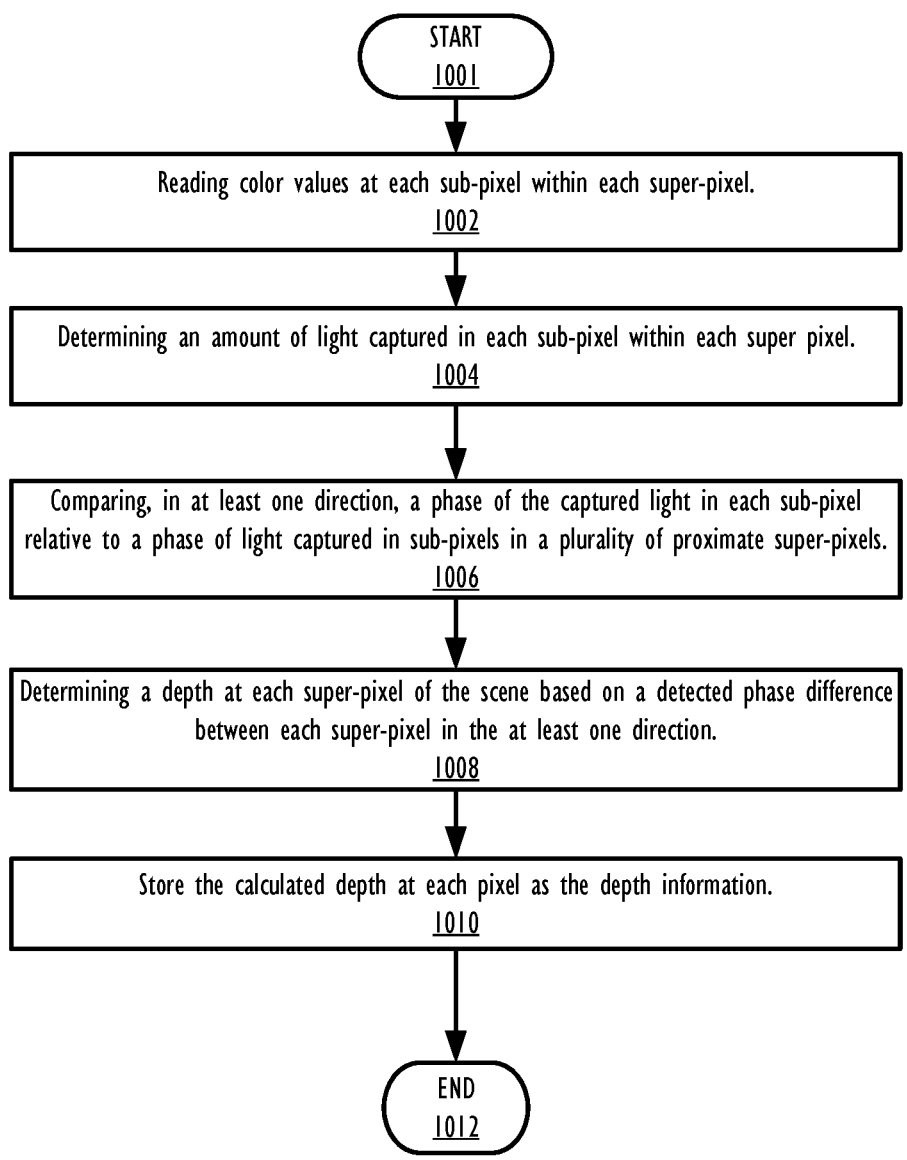
FIG. 10 is a flow chart illustrating a method for determining depth information of a scene, in accordance with the first embodiment of the disclosure.
Figure 11:
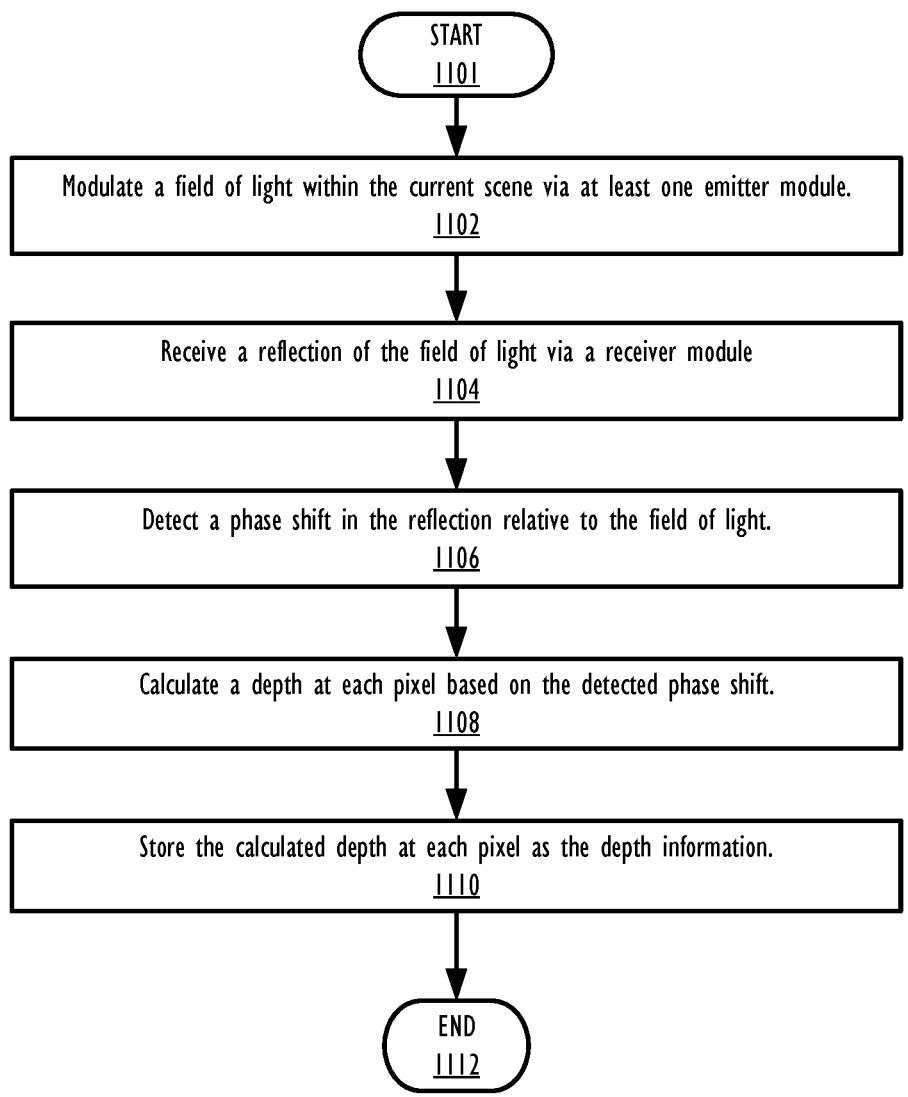
FIG. 11 is a flow chart illustrating a next method for determining depth information of a scene, in accordance with the second embodiment of the disclosure.
Figure 12:
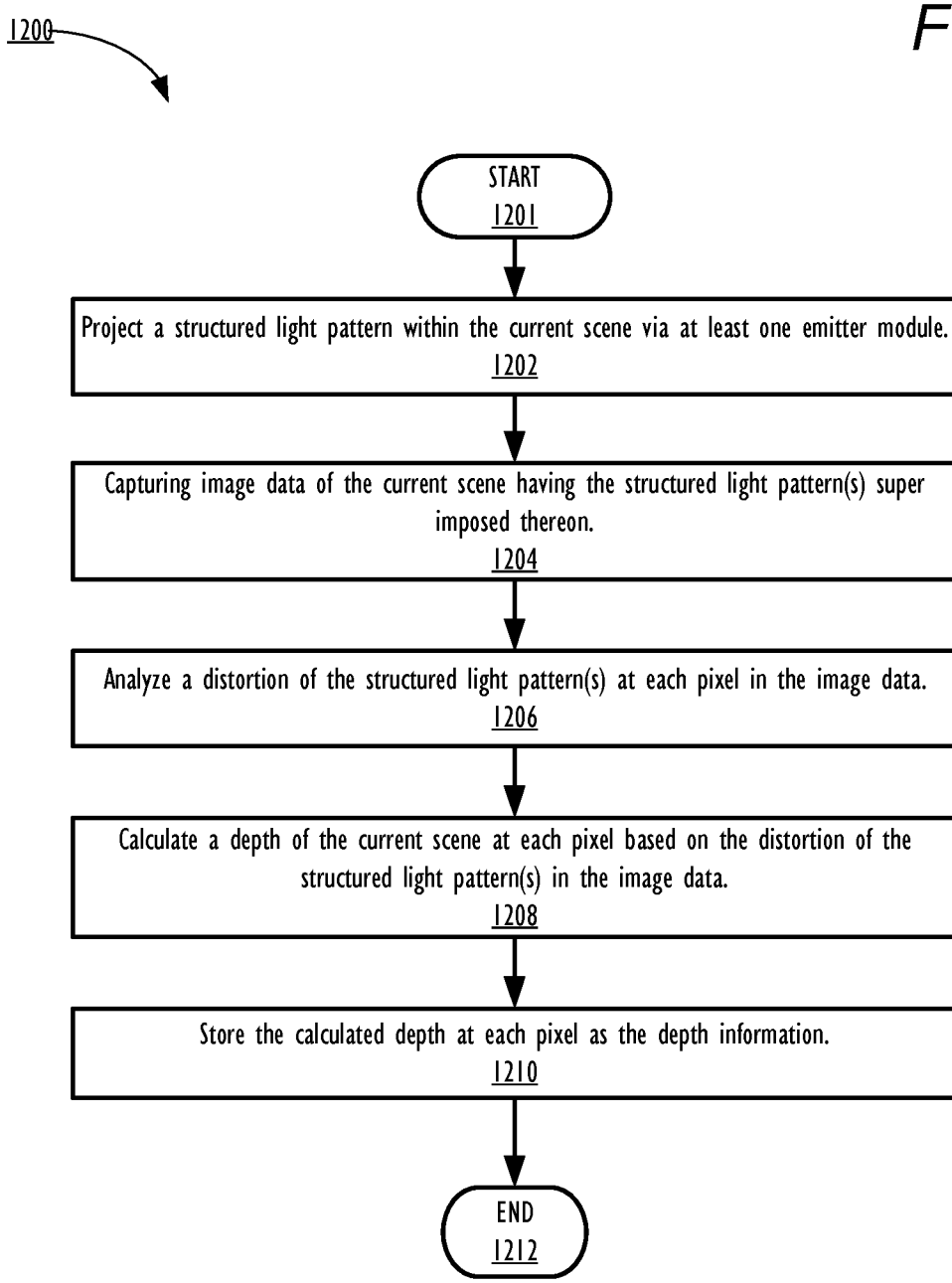
FIG. 12 is a flow chart illustrating another method for determining depth information of a scene, in accordance with the third embodiment of the disclosure.

The methods illustrated by FIGS. 10-12 presents different embodiments in which image capturing device 100 calculates and/or determines depth information 206. Aspects of the methods described in FIGS. 10-12 below are described with reference to the components of FIGS. 1-2 and 7. The methods described in FIGS. 10-12 are generally described as being performed by components of image capturing device 100.

Referring now to FIG. 10, there is depicted a high-level flow chart illustrating a method for determining depth information, in accordance with the first embodiment of the disclosure in which image capturing device 100 is configured with 2D light field image sensor 304, as described in FIG. 3. In the method described by FIG. 10, camera sensor 142 is configured with 2D light field image sensor 304, as illustrated in FIG. 3. Method 1000 commences at initiator block 1001 then proceeds to block 1002. At block 1002, CPU(s) 104 determines, from two-dimensional image 204, color values captured by each sub-pixel within each super-pixel. At block 1004, CPU(s) 104 determines an amount of captured light in each sub-pixel 714a-n within each super-pixel 712a-n. CPU(s) 104 compares, in at least one direction, a phase of the captured light in each sub-pixel 714a-n relative to a phase of light captured in sub-pixels in a plurality of proximate super-pixels 712a-n (block 1006). At block 1008, CPU(s) 104 determines a depth at each super-pixel 712a-n of scene 202 based on a phase difference between each super-pixel 712a-n in the at least one direction. At block 1010, CPU(s) 104 stores the depth at each super-pixel 712a-n as the depth information 206 of scene 202. Method 1000 then terminates at block 924.

Referring now to FIG. 11, there is depicted a high-level flow chart illustrating a method for determining depth information of a scene, in accordance with the second embodiment of the disclosure. In the method described by FIG. 11, image capturing device is configured with at least one emitter module for projecting a field of light and a time-of-flight receiver module, as illustrated in FIG. 4. Method 1100 commences at initiator block 1101 then proceeds to block 1102. At block 1102, CPU(s) 104 modulates field of light 402 within scene 202 via emitter module 124. At block 1104, receiver module 126 receives reflection 404 of the field of light 402. At block 1106, CPU(s) 104 detects, for each pixel in the scene, a phase shift in reflection 404 relative to the field of light 402. At block 1108, CPU(s) 104 calculates a depth of scene 202 at each pixel based on the detected phase shift. At block 1110, CPU(s) 104 stores the calculated depth at each pixel as depth information 206. Method 1100 then terminates at block 1112.

Referring now to FIG. 12, there is depicted a high-level flow chart illustrating a method for determining depth information of a scene, in accordance with the third embodiment of the disclosure. In the method described by FIG. 12, image capturing device 100 includes camera sensor 142 having a wide-angle lens, controller 128, at least one emitter module (emitter module(s) 124a-n) having a patterned mask for projecting a structured/coded light pattern (structured light pattern 502a) towards scene 202, and a receiver module (receiver module 126) for recording image data (image data 504a) of the scene with the structured light pattern superimposed thereon, as illustrated in FIG. 5. Method 1200 commences at initiator block 1201 then proceeds to block 1202. At block 1202, emitter module(s) 124a-n projects structured light pattern(s) 502a-n within scene 202. At block 1204, CPU(s) 104 captures image data 504a-n of scene 202 having structured light pattern(s) 502a-n superimposed thereon. At block 1206, CPU(s) 104 analyzes a distortion of structured light pattern(s) 502a-n at each pixel in image data 504a-n. At block 1208, CPU(s) 104 calculates a depth of scene 202 at each pixel based on a corresponding distortion of structured light pattern(s) 502a-n at each pixel in image data 504a-n. At block 1210, CPU(s) 104 stores the calculated depth at each pixel of image data 504a-n as depth information 206. Method 1200 then terminates at block 1212.

Figure 13:
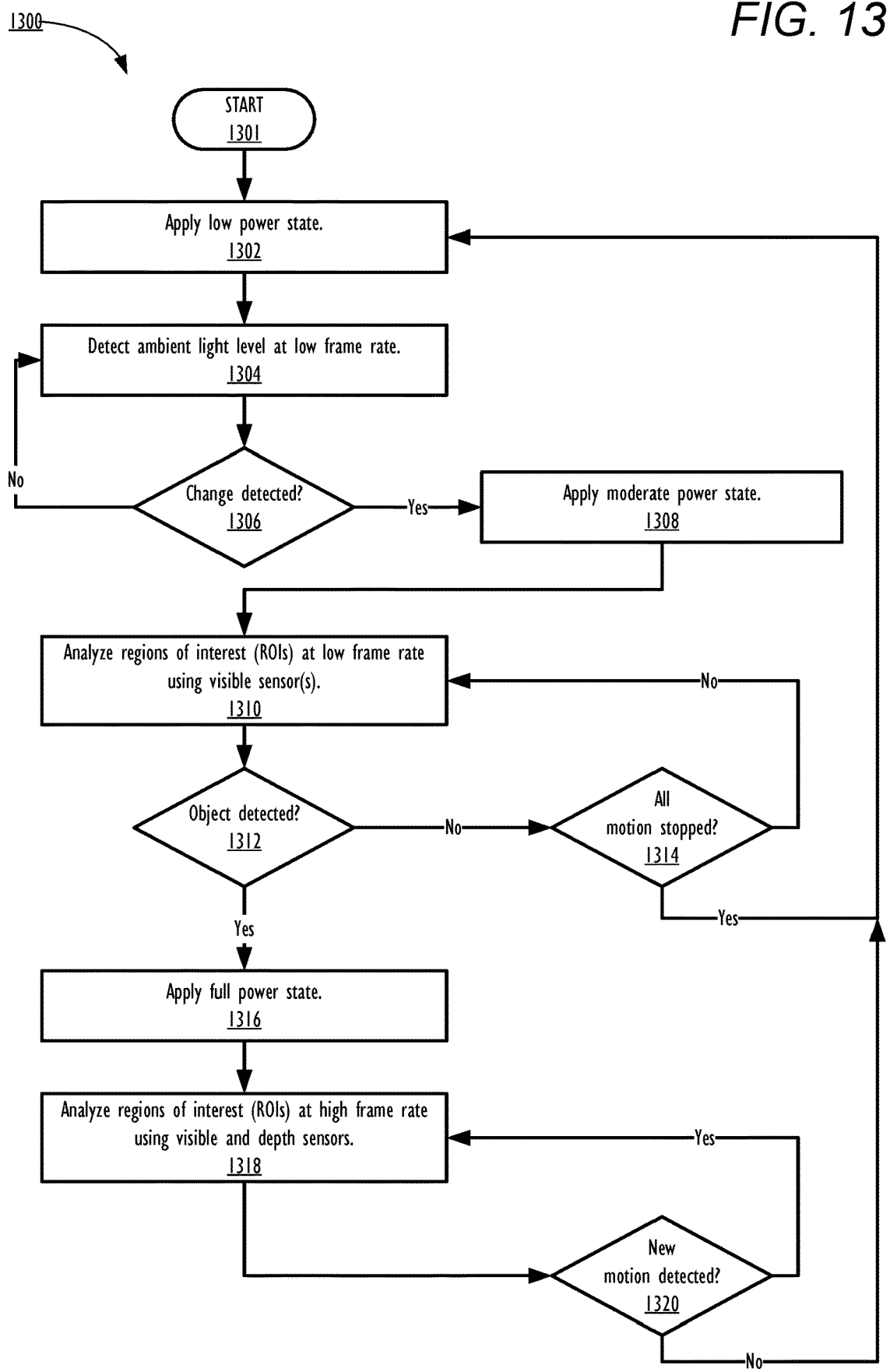
FIG. 13 is a flow chart illustrating a method for adapting power consumption of at least one image sensor based on ambient light and/or detected movement in a scene, in accordance with one or more embodiments.

Referring now to FIG. 13, there is depicted a high-level flow chart illustrating a method for continually monitoring a scene and adapting power consumption of at least one image sensor and/or depth sensing modules of an image capturing device based on detected ambient light and/or movement in the scene, in accordance with one or more embodiments. Method 1300 commences at initiator block 1301 then proceeds to block 1302. At block 1302, CPU(s) 104 applies a low power state to a visible sensor and depth sensing components of image capturing device 100. At block 1304, the visible sensor monitors an ambient light level of scene 202 at a low frame rate. At block 1306, CPU(s) 104 determines whether a change is detected in the ambient light level of scene 202. In response to failing to detect a change in the ambient light level, method 1300 proceeds back to block 1304. In response to detecting a change in the ambient light level, CPU(s) 104 applies a moderate power state to the visible sensor (block 1308). At block 1310, the visible sensor analyzes regions of interest at the low frame rate. At block 1312, CPU(s) 104 determines whether at least one object is detected in the regions of interest. In response to determining no objects are detected in the regions of interest, CPU(s) 104 determines whether all motion in the regions of interest by the object has stopped (block 1314). In response to determining all motion in the regions of interest has stopped, method 1300 proceeds back to block 1302. In response to determining motion still exists in the regions of interest, method 1300 proceeds back to block 1310 and the regions of interest are re-analyzed.

In response to detecting at block 1312 that at least one object is detected in the regions of interest, CPU(s) 104 applies a full power state to the visible sensor and the depth sensing components of image capturing device 100 (block 1316). At block 1318, the visible sensor and the depth sensing components analyze the regions of interest at a high frame rate for motion and/or changing ambient light conditions. At block 1320, CPU(s) 104 determines whether new motion is detected in the regions of interest. In response to determining new motion is detected, method 1300 loops back to block 1318 and the regions of interest are re-analyzed by the visible sensor and the depth sensing components at a high frame rate to determine whether the specific objects are now present within the regions of interest. In response to determining no new motion is detected in the regions of interest by either of the visible sensor and the depth sensing components, method 1300 proceeds back to block 1302.

In the above-described flow charts, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
   capturing, via a wide-angle camera sensor of an image capturing device, a two-dimensional image of a scene, the wide-angle camera sensor including a two-dimensional light-field image sensor having a plurality of micro-lenses, each micro-lens having a color filter that covers a super-pixel;
   determining depth information of the scene by: detecting, for each pixel in the scene, a phase shift in a reflection relative to a field of light and calculating, based on the detected phase shift, a depth of the scene at each pixel;
   generating, from the depth information, a depth map that depicts a depth of the scene in a third dimension; and
   generating a wide-angle three-dimensional image by merging the depth map and the two-dimensional image.

2. The method of claim 1, wherein:
   each super-pixel includes an array of sub-pixels arranged in a quadrilateral pattern; and
   determining the depth information further comprises:
      determining, from the two-dimensional image, color values captured by each sub-pixel within each super-pixel;
      determining an amount of captured light in each sub-pixel within each super-pixel;
      comparing, in at least one direction, a phase of the captured light in each sub-pixel relative to a phase of light captured in sub-pixels in a plurality of proximate super-pixels;
      determining a depth of the scene at each super-pixel based on a phase difference between each super-pixel in the at least one direction; and
      storing the depth at each super-pixel as the depth information of the scene.

3. The method of claim 2, wherein determining the depth at each super-pixel further comprises averaging a phase value of the plurality of proximate super-pixels.

4. The method of claim 1, wherein:
   the wide-angle camera sensor is a first wide-angle camera sensor that is attached to a first side of the image capturing device and aligned in a first direction;
   a second wide-angle camera sensor is attached to a second side of the image capturing device, aligned in a second direction that is opposite the first direction; and
   the method further comprises:
      analyzing conditions of the scene by the first and second wide-angle camera sensors;
      determining, based on the analysis of the conditions, a preferred capture mode for capturing the scene by the first and second wide-angle camera sensors;
      applying the preferred capture mode to the first and second wide-angle camera sensors;
      synchronizing the capture of the two-dimensional image by the first wide-angle camera sensor with a capture of a second two-dimensional image by the second wide-angle camera sensor;
      generating a second wide-angle three-dimensional image by merging the depth map and the second two-dimensional image; and
      combining the wide-angle three-dimensional image associated with the first wide-angle camera sensor with the second wide-angle three-dimensional image associated with the second wide-angle camera sensor to create a surround view three-dimensional image that captures the scene in circumferential view along an azimuth axis.

5. The method of claim 1, wherein:
   determining the depth information is performed by a depth detection module that includes at least one emitter module and a time-of-flight receiver module; and
   the determining of the depth information further comprises:
      modulating, via the at least one emitter module, the field of light within the scene;

receiving, via the time-of-flight receiver module, the reflection of the field of light; and storing the calculated depth at each pixel as the depth information.

6. The method of claim 5, further comprising:

synchronizing, via a control module, the capture of the two-dimensional image by the at least one wide-angle camera sensor and the projection of the field of light by the at least one emitter module.

7. The method of claim 1, wherein:

determining the depth information is performed by a depth detection module, which includes a receiver module and an emitter module that is arranged with the receiver module along a baseline; and the determining of the depth information further comprises:

projecting, via the emitter module, a structured light pattern within the scene;

capturing, via the receiver module, image data of the scene having the structured light pattern superimposed thereon;

analyzing a distortion of the structured light pattern at each pixel in the image data;

calculating a depth of the scene at each pixel based on a corresponding distortion of the structured light pattern in the image data; and storing the calculated depth at each pixel of the image data as the depth information.

8. The method of claim 1, wherein:

determining the depth information is performed by a depth detection module, which includes a receiver module, a first emitter module that is arranged with the receiver module along a first baseline, and a second emitter module that is arranged with the receiver module along a second baseline that is different from the first baseline; and the determining of the depth information further comprises:

projecting, via the first emitter module, a first structured light pattern within the scene during a first time interval;

capturing, via the receiver module, first image data of the scene having the first structured light pattern superimposed thereon;

projecting, via the second emitter module, a second structured light pattern within the scene during a second time interval, the second time interval being different from the first time interval;

capturing, via the receiver module, second image data of the scene having the second structured light pattern superimposed thereon;

analyzing a distortion of the first structured light pattern in the first image data;

calculating a first depth of the scene at each pixel based on the distortion of the first structured light pattern;

analyzing a distortion of the second structured light pattern in the second image data;

calculating a second depth of the scene at each pixel based on the distortion of the second structured light pattern;

merging the first depth and the second depth to determine a depth at each pixel of the scene; and storing the determined depth at each pixel as the depth information.

9. An image capturing device, comprising:

a wide-angle camera sensor that captures a two-dimensional image of a scene, the wide-angled camera sensor including a two-dimensional light-field image sensor having a plurality of micro-lenses, each micro-lens having a color filter that covers a super-pixel;

a depth detection module that determines depth information of the scene by: detecting, for each pixel in the scene, a phase shift in a reflection relative to a field of light and calculating, based on the detected phase shift, a depth of the scene at each pixel; and a processor that:

generates, from the depth information, a depth map that depicts a depth of the scene in a third dimension; and generates a wide-angle three-dimensional image by merging the depth map and the two-dimensional image.

10. The image capturing device of claim 9, wherein:

the depth detection module is a sub-component within the wide-angle camera sensor;

each super-pixel includes an array of sub-pixels arranged in a quadrilateral pattern; and to capture the depth information:

the wide-angle camera sensor determines, from the two-dimensional image, color values captured by each sub-pixel within each super-pixel; and the processor:

detects an amount of captured light in each sub-pixel within each super-pixel;

compares, in at least one direction, a phase of the captured light in each sub-pixel relative to a phase of light captured in sub-pixels in a plurality of proximate super-pixels;

determines a depth at each super-pixel of the scene based on a phase difference between each super-pixel in the at least one direction; and stores the depth at each super-pixel as the depth information of the scene.

11. The image capturing device of claim 10, wherein in determining the depth at each super-pixel, the processor averages a phase value of the plurality of proximate super-pixels.

12. The image capturing device of claim 9, wherein:

the wide-angle camera sensor is a first wide-angle camera sensor that is attached to a first side of the image capturing device and aligned in a first direction, and which analyzes a first set of conditions of the scene;

the image capturing device further comprises a second wide-angle camera sensor attached to a second side of the image capturing device, aligned in a second direction that is opposite the first direction, and which analyzes second set of conditions of the scene;

the processor:

determines based on the analysis of the conditions, a preferred capture mode for capturing the scene by the first and second wide-angle camera sensors; and applies the preferred capture mode to the first and second wide-angle camera sensors;

the image capturing device further comprises a control module that synchronizes the capture of the two-dimensional image by the first wide-angle camera sensor with a capture of a second two-dimensional image by the second wide-angle camera sensor; and the processor:

generates a second wide-angle three-dimensional image by merging the depth map and the second two-dimensional image; and creates a surround view three-dimensional image that captures the scene in circumferential view along an azimuth axis by combining a first wide-angle three-dimensional image associated with the first wide-angle camera sensor with a second wide-angle three-dimensional image associated with the second wide-angle camera sensor.

13. The image capturing device of claim 9, wherein:
the depth detection module includes:
at least one emitter module that modulates the field of light within the scene; and
a time-of-flight receiver module that receives a reflection of the field of light and detects a phase of light at each pixel in the image data; and
the processor:
stores the calculated depth at each pixel as the depth information.

14. The image capturing device of claim 13, further comprising:
a control model that synchronizes the capture of the two-dimensional image by the at least one wide-angle camera sensor and the projection of the field of light by the at least one emitter module.

15. The image capturing device of claim 9, wherein:
the depth detection module includes:
an emitter module that projects a structured light pattern within the scene; and
a receiver module that is arranged with the emitter module along a baseline and which captures image data of the scene having the structured light pattern superimposed thereon; and
the processor:
analyzes a distortion of the structured light pattern at each pixel in the image data;
calculates a depth of the scene at each pixel based on a corresponding distortion of the structured light pattern in the image data; and
stores the calculated depth at each pixel of the image data as the depth information.

16. The image capturing device of claim 9, wherein:
the depth detection module includes:
a first emitter module that projects a first structured light pattern within the scene during a first time interval;
a second emitter module that projects a second structured light pattern within the scene during a second time interval that is different from the first time interval; and
a receiver module that is arranged with: (a) with the first emitter baseline along a first baseline and (b) the second emitter module along a second baseline that is different from the first baseline, and that:
captures, during the first time interval, first image data of the scene having the first structured light pattern superimposed thereon; and
captures, during the second time interval, second image data of the scene having the second structured light pattern superimposed thereon; and
the processor:
analyzes a distortion of the first structured light pattern in the first image data;
calculates a first depth of the scene at each pixel based on the distortion of the first structured light pattern in the first image data;
analyzes a distortion of the second structured light pattern in the second image data;
calculates a second depth of the scene at each pixel based on a corresponding distortion of the second structured light pattern in the second image data;

merges the first depth and the second depth to determine a depth at each pixel of the scene; and
stores the determined depth at each pixel as the depth information.

17. A computer program product comprising:
a non-transitory computer readable storage device; and
program code on the non-transitory computer readable storage device that, when executed by a processor associated with an image capturing device, enables the image capturing device to provide the functionality of:
capturing, via a wide-angle camera sensor of the image capturing device, a two-dimensional image of a scene, wherein the wide-angle camera sensor includes a two-dimensional light-field image sensor having a plurality of micro-lenses, each micro-lens having a color filter that covers a super-pixel;
determining depth information of the scene by: detecting, for each pixel in the scene, a phase shift in a reflection relative to a field of light and calculating, based on the detected phase shift, a depth of the scene at each pixel;
generating, from the depth information, a depth map that depicts a depth of the scene in a third dimension; and
generating a wide-angle three-dimensional image by merging the depth map and the two-dimensional image.

18. The computer program product of claim 17, wherein:
each super-pixel includes an array of sub-pixels arranged in a quadrilateral pattern; and
the program code for capturing the depth information further comprises program code for:
determining, from the two-dimensional image, color values captured by each sub-pixel within each super-pixel;
determining an amount of captured light in each sub-pixel within each super-pixel;
comparing, in at least one direction, a phase of the captured light in each sub-pixel relative to a phase of light captured in sub-pixels in a plurality of proximate super-pixels;
determining a depth at each super-pixel of the scene based on a phase difference between each super-pixel in the at least one direction; and
storing the depth at each super-pixel as the depth information of the scene.

19. The computer program product of claim 17, wherein:
the wide-angle camera sensor comprises a first wide-angle camera sensor that is attached to a first side of the image capturing device and aligned in a first direction and a second wide-angle camera sensor attached to a second side of the image capturing device, aligned in a second direction that is opposite the first direction; and
the program code further comprises code that enables the image capturing device to provide the functionality of:
analyzing conditions of the scene by the first and the second wide-angle camera sensors;
determining, based on the analysis of the conditions, a preferred capture mode for capturing the scene by the first and second wide-angle camera sensors;
applying the preferred capture mode to the first and second wide-angle camera sensors;
synchronizing the capture of the two-dimensional image by the first wide-angle camera sensor with a capture of a second two-dimensional image by the second wide-angle camera sensor;

generating a second wide-angle three-dimensional image by merging the depth map and the second two-dimensional image; and combining the wide-angle three-dimensional image associated with the first wide-angle camera sensor with the second wide-angle three-dimensional image associated with the second wide-angle camera sensor to create a surround view three-dimensional image that captures the scene in circumferential view along an azimuth axis.

20. The method of claim 1, wherein each color filter separates colored light received from the corresponding micro-lens into an individual color captured by sub-pixels within the corresponding super-pixel.

* * * * *